US012291241B2

(12) United States Patent
Cha et al.

(10) Patent No.: US 12,291,241 B2
(45) Date of Patent: May 6, 2025

(54) TRANSPORTATION SYSTEM AND TRANSPORTATION METHOD USING MULTIPURPOSE VEHICLE

(71) Applicants: Hyundai Motor Company, Seoul (KR); Kia Corporation, Seoul (KR)

(72) Inventors: Dong Eun Cha, Hwaseong-Si (KR); Sang Heon Lee, Seoul (KR); Jin Ho Hwang, Cheonan-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 290 days.

(21) Appl. No.: 17/694,238

(22) Filed: Mar. 14, 2022

(65) Prior Publication Data
US 2022/0410941 A1    Dec. 29, 2022

(30) Foreign Application Priority Data

Jun. 24, 2021 (KR) .................... 10-2021-0082637

(51) Int. Cl.
| | |
|---|---|
| *B60W 60/00* | (2020.01) |
| *B60P 3/07* | (2006.01) |
| *E05F 15/73* | (2015.01) |
| *H04L 67/12* | (2022.01) |

(52) U.S. Cl.
CPC ......... *B60W 60/00253* (2020.02); *B60P 3/07* (2013.01); *E05F 15/73* (2015.01); *H04L 67/12* (2013.01); *B60W 2556/45* (2020.02); *E05Y 2400/45* (2013.01); *E05Y 2400/85* (2013.01); *E05Y 2900/506* (2013.01); *E05Y 2900/531* (2013.01); *E05Y 2900/54* (2013.01)

(58) Field of Classification Search
CPC ......... B60W 60/00253; B60W 2556/45; E05F 15/73; B60P 3/07; H04L 67/12; E05Y 2400/45; E05Y 2400/85; E05Y 2900/506; E05Y 2900/531; E05Y 2900/54
USPC ........................................... 701/24
See application file for complete search history.

(56) References Cited

U.S. PATENT DOCUMENTS

| | | | | |
|---|---|---|---|---|
| 4,071,152 A | * | 1/1978 | Kinkead | A61G 3/0808 414/545 |
| 7,097,407 B2 | * | 8/2006 | Kurohori | B62H 3/00 414/556 |
| 11,572,084 B2 | * | 2/2023 | MacPherson | B60G 11/27 |

(Continued)

FOREIGN PATENT DOCUMENTS

| | | | | |
|---|---|---|---|---|
| JP | 3931598 | | 6/2007 | |
| JP | 2021068232 A | * | 4/2021 | ............ B60W 30/06 |

(Continued)

*Primary Examiner* — Yazan A Soofi
*Assistant Examiner* — Ahmed Alkirsh
(74) *Attorney, Agent, or Firm* — Morgan, Lewis & Bockius LLP (57) ABSTRACT

A transportation system includes a multipurpose vehicle in which a loading space for a mobility device and a boarding space for passengers are provided; and a control unit configured to control opening or closing of the loading space, opening or closing of the boarding space, and driving of the vehicle so that, when there is a passenger who possesses or utilizes the mobility device among passengers, opening or closing of the loading space, opening or closing of the boarding space, and driving of the vehicle interwork with each other.

16 Claims, 3 Drawing Sheets

(56) References Cited

U.S. PATENT DOCUMENTS

| | | | |
|---|---|---|---|
| 2010/0174567 A1* | 7/2010 | King | G07F 17/12 |
| | | | 235/382 |
| 2017/0355295 A1* | 12/2017 | Gutowitz | B60K 1/00 |
| 2019/0083334 A1* | 3/2019 | MacPherson | A61G 3/061 |
| 2019/0265703 A1* | 8/2019 | Hicok | G05D 1/617 |
| 2019/0303806 A1* | 10/2019 | Namba | G06Q 50/40 |
| 2020/0104770 A1* | 4/2020 | Aich | A61G 3/0808 |
| 2020/0159251 A1* | 5/2020 | Iwasaki | H04N 5/74 |
| 2020/0290686 A1* | 9/2020 | Suzuki | B62D 63/02 |
| 2020/0410408 A1* | 12/2020 | Shitara | G06Q 50/40 |
| 2021/0107519 A1* | 4/2021 | Gassmann | G06Q 10/04 |
| 2021/0147018 A1* | 5/2021 | Jones | B60D 1/56 |
| 2021/0166192 A1* | 6/2021 | Balva | G06Q 50/40 |
| 2021/0197868 A1* | 7/2021 | Peloquin | B61D 47/00 |
| 2021/0326783 A1* | 10/2021 | Kim | G01C 21/3697 |
| 2022/0001901 A1* | 1/2022 | Van Der Donk | B61D 3/20 |
| 2022/0270411 A1* | 8/2022 | Bennett | G06Q 10/08 |
| 2023/0095845 A1* | 3/2023 | Wilson | G06V 20/59 |
| | | | 701/1 |

FOREIGN PATENT DOCUMENTS

| | | |
|---|---|---|
| KR | 10-1896055 | 9/2018 |
| KR | 10-2020-0095111 | 8/2020 |
| KR | 10-2020-0140193 | 12/2020 |
| KR | 10-2214989 | 2/2021 |
| KR | 10-2233272 | 3/2021 |
| KR | 10-2306161 | 9/2021 |

* cited by examiner

TRANSPORTATION SYSTEM AND TRANSPORTATION METHOD USING MULTIPURPOSE VEHICLE

CROSS REFERENCE TO RELATED APPLICATION

The present application claims priority to Korean Patent Application No. 10-2021-0082637 filed on Jun. 24, 2021, the entire contents of which is incorporated herein for all purposes by this reference.

BACKGROUND OF THE INVENTION

Field of the Invention

The present invention relates to a transportation system and a transportation method using a multipurpose vehicle, and more specifically, to a transportation system and a transportation method using a multipurpose vehicle, wherein opening/closing of a loading space, opening/closing of a boarding space, and driving of a vehicle are controlled such that, when there is a passenger who possesses or utilizes a small mobility device among passengers, opening/closing of the loading space, opening/closing of the boarding space, and driving of the vehicle interwork with each other.

Description of Related Art

There has been technological development for implementing a space for loading a small mobility device or a space to be occupied by a passenger who carries or utilizes a small mobility device when a passenger who carries or utilizes a small mobility device gets aboard a multipurpose vehicle.

If such a space for loading a small mobility device or a space to be occupied by a passenger who carries or utilizes a small mobility device is implemented to provide a small mobility device loading space and a passenger boarding space, there is difficulty in managing the opening/closing of the loading space and the opening/closing of the boarding space and in controlling the multipurpose vehicle.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a transportation system using a vehicle, wherein opening/closing of a loading space, opening/closing of a boarding space, and driving of a vehicle are controlled such that, when there is a passenger who possesses or utilizes the mobility device among passengers, opening/closing of the loading space, opening/closing of the boarding space, and driving of the vehicle interwork with each other.

In accordance with an aspect, various aspects of the present invention provide a transportation system using a vehicle, the transportation system including: a vehicle in which a loading space for a mobility device and a boarding space for a passenger are provided; and a control unit configured to control opening or closing of the loading space, opening or closing of the boarding space, and driving of the vehicle so that, when there is a passenger who possesses or utilizes the mobility device among passengers, opening or closing of the loading space, opening or closing of the boarding space, and driving of the vehicle interwork with each other.

The vehicle may be provided with a loading space door for opening or closing the loading space, and a boarding door for opening or closing the boarding space.

The control unit may include: a vehicle controller provided in the vehicle and configured to control opening or closing of the loading space, opening or closing of the boarding space, and driving of the vehicle; and a server provided outside the vehicle and configured to receive a request from a passenger terminal and transmit the request to the vehicle controller.

The server may be configured to receive a request for boarding or unboarding from the passenger terminal, and if information regarding use of a mobility device loading space is included therein, to transmit the request and the information together to the vehicle controller.

The vehicle controller may be configured to check whether the mobility device is loaded on the vehicle and whether the passenger is on board on the vehicle to control opening or closing of the loading space, opening or closing of the boarding space, and driving of the vehicle.

The server may be configured to receive the request for boarding or unboarding through a kiosk provided inside or outside of the vehicle.

When the mobility device is loaded and the passenger is boarded, the vehicle controller may be configured to control driving of the vehicle after closing the loading space and the boarding space.

In accordance with another aspect, various aspects of the present invention provide a transportation method using a vehicle, the transportation method including: receiving a request input to a passenger terminal of a passenger who possesses or utilizes the mobility device and transmitting the request to a vehicle controller, by a server; opening or closing a loading space and a boarding space of the vehicle, in which the passenger is to board, when the vehicle departs, by the vehicle controller according to the request received by the server; and opening or closing the loading space and the boarding space of the vehicle to allow the passenger who possesses the mobility device to unboard when the vehicle arrives according to the request input to the passenger terminal.

The opening or closing of the loading space and the boarding space when the vehicle departs, by the vehicle controller may include opening or closing the loading space to allow the mobility device to be loaded and then opening or closing the boarding space to which the passenger is to board, by the vehicle controller.

The opening or closing of the loading space and the boarding space when the vehicle arrives, by the vehicle controller may include opening or closing the boarding space from which the passenger is to unboard to allow the passenger to unboard, and then opening or closing the loading space.

The receiving of the request input to the passenger terminal of the passenger who possesses or utilizes the mobility device and the transmitting of the request to the vehicle controller, by the server, may include receiving a request for boarding or unboarding from the passenger terminal, and if information regarding use of the mobility device loading space is included therein, transmitting the request and the information together to the vehicle controller.

The receiving of the request input to the passenger terminal of the passenger who possesses or utilizes a mobility device and the transmitting of the request to the vehicle controller, by the server, may include receiving the request for boarding or unboarding through a kiosk provided inside or outside of the vehicle and transmitting the request to the vehicle controller.

The transportation method may further include receiving, by the server, updated opening/closing information of the loading space and the boarding space, after the opening or closing, by the vehicle controller, the loading space and the boarding space of the vehicle to which the passenger is to board when the vehicle departs according to the request received by the server.

The transportation method may further include receiving, by the server, updated opening/closing information of the loading space and the boarding space, after the opening or closing of the loading space and the boarding space of the vehicle to allow the passenger who possesses the mobility device to unboard when the vehicle arrives.

The transportation method may further include controlling, by the vehicle controller, driving of the vehicle after closing the loading space and the boarding space when the mobility device is unloaded and the passenger is unboarded, after the opening or closing of the loading space and the boarding space of the vehicle to allow the passenger who carries the mobility device to unboard when the vehicle arrives.

A transportation system and a transportation method using a vehicle according to various exemplary embodiments of the present invention are advantageous in that opening/closing of a loading space, opening/closing of a boarding space, and driving of a vehicle are controlled such that, when there is a passenger who possesses or utilizes the mobility device among passengers, opening/closing of the loading space, opening/closing of the boarding space, and driving of the vehicle interwork with each other. Accordingly, passengers can freely move inside the vehicle, and small mobility devices of the passengers can conveniently board/unboard the same.

Advantageous effects obtainable from the present invention may not be limited to the above mentioned effects, and other effects which are not mentioned may be clearly understood, through the following descriptions, by those skilled in the art to which various exemplary embodiments of the present invention pertains.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

A specific structural or functional description of embodiments of the present invention disclosed in the specification or application is provided merely for the purpose of describing the exemplary embodiment according to various exemplary embodiments of the present invention. Therefore, the exemplary embodiments according to various exemplary embodiments of the present invention may be implemented in various forms, and the present invention should not be construed as being limited to the exemplary embodiments described in the specification or application. Hereinafter, embodiments of the present invention will be described in detail with reference to the accompanying drawings.

Figure 1:
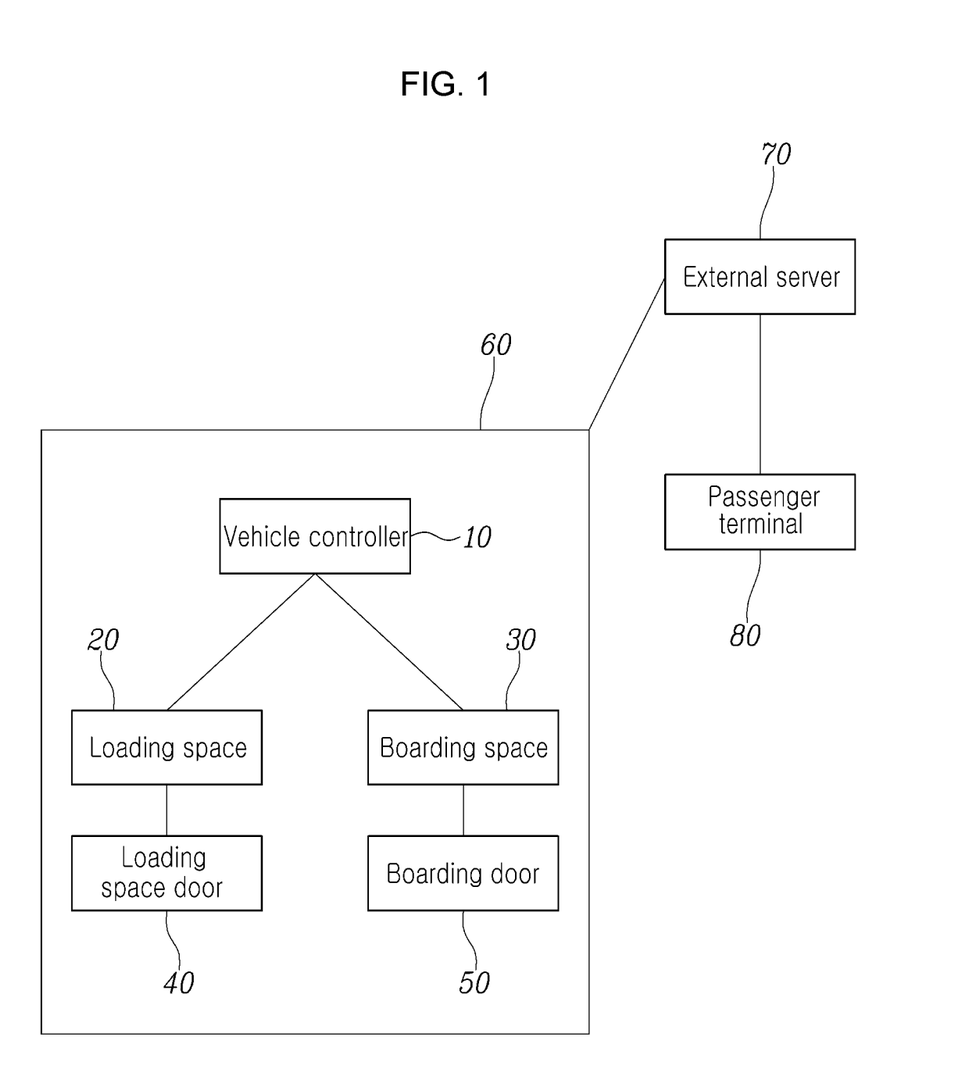
FIG. 1 illustrates a transportation system using a multipurpose vehicle according to various exemplary embodiments of the present invention.
Figure 2:
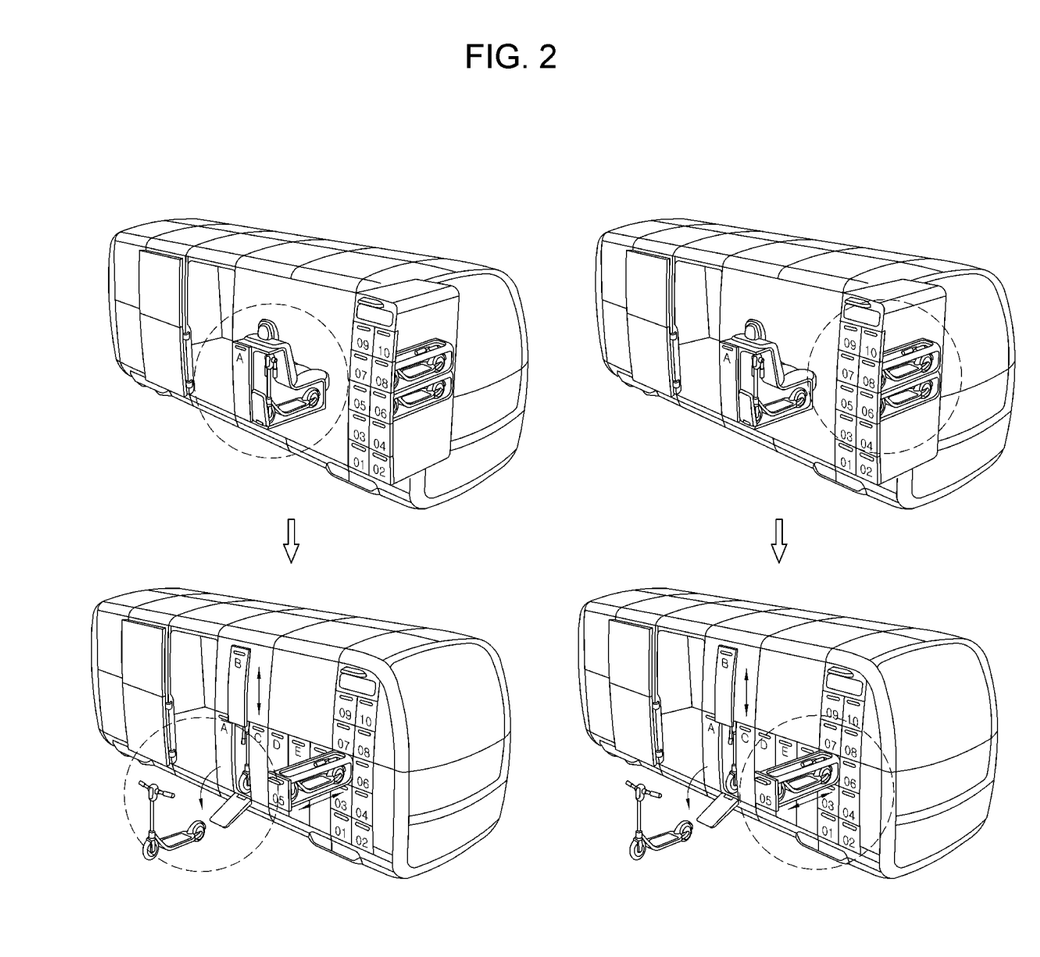
FIG. 2 illustrates opening or closing of a loading space and opening or closing of a boarding space in a multipurpose vehicle.
Figure 3:
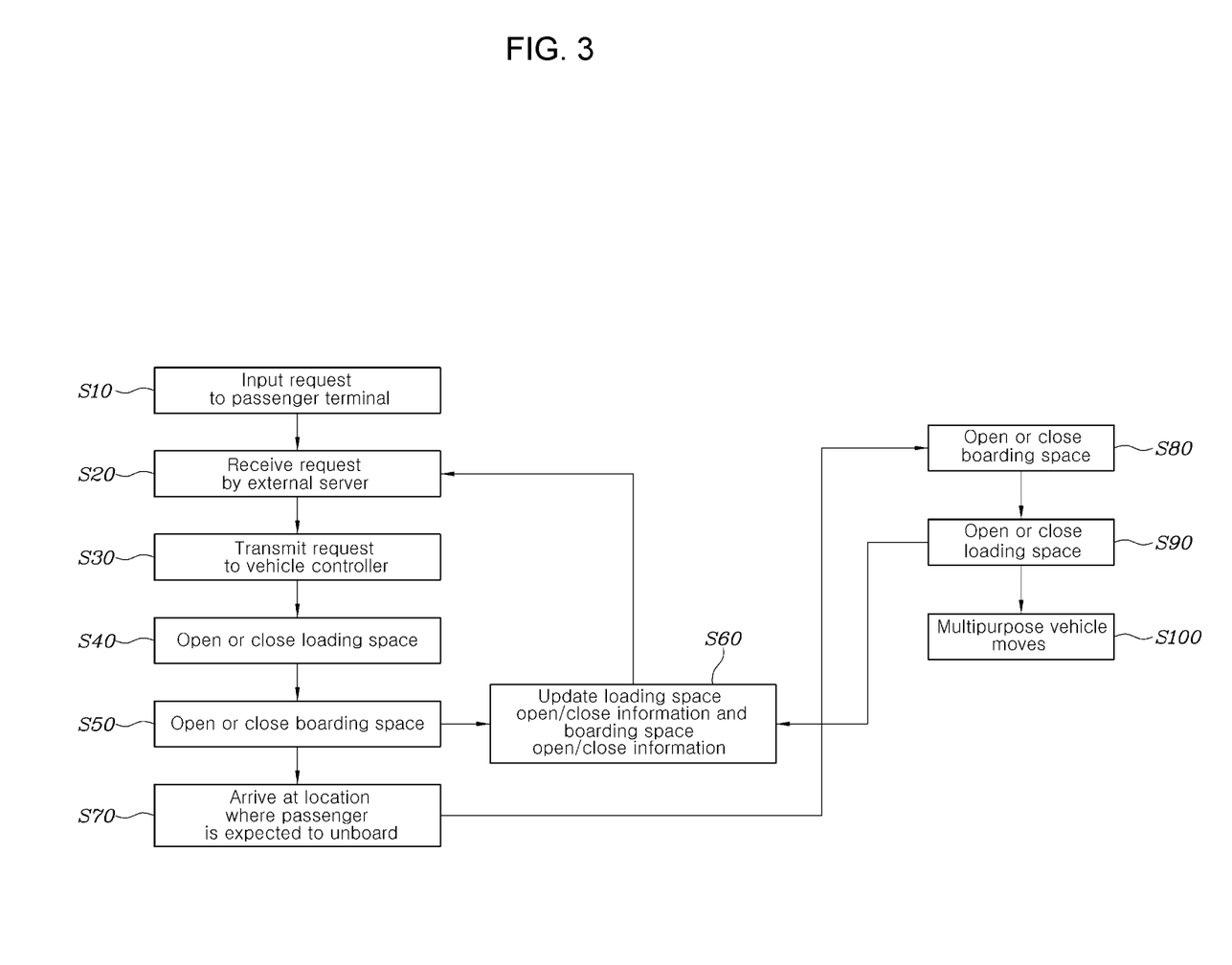
FIG. 3 is a flowchart illustrating the operation of a transportation method using a multipurpose vehicle.

FIG. 1 illustrates a transportation system using a multipurpose vehicle according to various exemplary embodiments of the present invention. FIG. 2 illustrates opening or closing of a loading space and opening or closing of a boarding space in a multipurpose vehicle. FIG. 3 is a flowchart illustrating the operation of a transportation method using a multipurpose vehicle.

FIG. 1 illustrates a transportation system using a multipurpose vehicle 60 according to various exemplary embodiments of the present invention. Referring to FIG. 1, the transportation system using the multipurpose vehicle 60 includes: the multipurpose vehicle 60 in which a loading space 20 for a small mobility device and a boarding space 30 for a passenger are provided; and a control unit configured to control opening or closing of the loading space 20, opening or closing of the boarding space 30, and driving of a vehicle such that, when there is a passenger who possesses or utilizes a small mobility device among passengers, opening or closing of the loading space, opening or closing of the boarding space, and driving of the vehicle interwork with each other.

Various aspects of the present invention provide a transportation system using the multipurpose vehicle 60, the system being configured to control opening or closing of the loading space 20, opening or closing of the boarding space 30, and driving of a vehicle such that, when there is a passenger who possesses or utilizes a small mobility device among passengers, opening or closing of the loading space, opening or closing of the boarding space, and driving of the vehicle interwork with each other. To the present end, it is required to make an algorithm by which a passenger who possesses or utilizes a small mobility device can board or unboard to or from the multipurpose vehicle 60, and an algorithm for loading and unloading the small mobility device.

In general, a vehicle transport system is implemented such that a passenger himself or herself loads baggage in a vehicle before boarding the vehicle, and unloads the baggage from the vehicle after the passenger unboards at a predetermined place. Therefore, if the loading space 20 to which a baggage is loaded is provided in a vehicle, it is common for a passenger having the baggage to load the baggage into the loading space by himself or herself, or in a case of an inter-city bus, a driver loads the baggage into the loading space instead of the passenger. However, recently, with the development of autonomous driving systems, unmanned autonomous driving systems operating without human drivers are emerging. Therefore, in a case of unmanned autonomous driving systems, the passenger having baggage needs to load the baggage into a vehicle by himself or herself. However, in a case of an autonomous inter-city bus, there is no driver to load the baggage and thus it is required to perform control such that opening or closing of the loading space 20, opening or closing of the boarding space 30, and driving of the vehicle interwork with each other for the efficiency of space utilization.

In the unmanned autonomous driving system, since a server 70 and a vehicle controller 10 manage the autonomous driving system of the multipurpose vehicle 60 rather than the driver performing driving by himself/herself, a logic related to opening or closing of the loading space 20 for loading passenger's baggage is important, and a logic related to opening or closing of the boarding space 30 of the multipurpose vehicle 60 to which a passenger is to board or from which the passenger is to unboard, separately from loading or unloading the baggage into or from the loading space 20, is also important. The multipurpose vehicle 60 may include a purpose-built mobility vehicle, which is a vehicle that may be assembled according to various uses. The purpose-built mobility vehicle refers to eco-friendly, multipurpose mobility device that utilizes autonomous driving to connect people to people on the road and has infinite scalability. Furthermore, small mobility devices such as electric kickboards, electric motorcycles, and electric bicycles using electric motors are increasing. As the number of services that offer subscription for or rent small mobility devices is increasing, the number of individuals who possess small mobility devices is increasing accordingly, and thus the unmanned autonomous driving systems need to evolve accordingly. Therefore, if an individual boards on the multipurpose vehicle 60 while riding or carrying his or her own small mobility device, the passenger cannot move freely inside the multipurpose vehicle 60, and loading/unloading of the small mobility device is not smoothly performed. As a result, there is a demand for passengers to be able to freely move inside the multipurpose vehicle 60 and to smoothly perform loading/unloading of small mobility devices possessed or used by the passengers.

Therefore, the present invention can control opening or closing of the loading space 20, opening or closing of the boarding space 30, and driving of the vehicle such that, when there is a passenger who possesses or utilizes a small mobility device among passengers, opening or closing of the loading space, opening or closing of the boarding space, and driving of the vehicle interwork with each other, to enable the passenger to freely move inside the multipurpose vehicle 60 and to smoothly load or unload the small mobility device.

The multipurpose vehicle 60 is provided with the loading space 20 for a small mobility device and the boarding space 30 for passengers. Furthermore, the multipurpose vehicle 60 is provided with a vehicle controller 10 configured to control opening or closing of the loading space 20 and opening or closing of the boarding space 30, and the control of the opening or closing of the loading space 20 and the boarding space 30 by the vehicle controller 10 is performed through opening or closing of a loading space door 40 used for entrance and exit for the loading space 20 and a boarding space door 50 used for entrance and exit for the boarding space 30. Furthermore, the multi-purpose vehicle 60 includes a server 70 configured to receive a request for boarding or unboarding from a passenger terminal 80, and if information regarding use of the small-mobility device loading space 20 is included therein, configured to transmit the request and the information together to the vehicle controller 10. The control unit includes: the vehicle controller 10 configured to control opening or closing of the loading space 20 and opening or closing of the boarding space 30; and the server 70 configured to receive a request for boarding or unboarding from the passenger terminal 80, and if information regarding use of the small-mobility device loading space 20 is included therein, transmit the request and the information together to the vehicle controller 10.

Here, the server 70 receives a request input by the passenger through the passenger terminal 80 that the passenger always carries, and transmits the request to the vehicle controller 10. The vehicle controller 10 provides information related to a vehicle in the vicinity of an area where the passenger is expected to board, based on the received request, and thus enables the multipurpose vehicle 60 to arrive at a place where the passenger is to board. In the instant case, if the passenger possesses or utilizes a small mobility device such as an electric kickboard, the vehicle controller opens the loading space door 40 of the loading space 20 of the multipurpose vehicle 60. When the passenger's small mobility device is loaded into the loading space 20, the loading space door 40 is closed and thus the boarding door 50 of the boarding space 30 is opened to enable the passenger to board. When the passenger is boarded on the boarding space 30, the vehicle controller recognizes the boarding of the passenger to enable the multipurpose vehicle 60 to move to a destination. Before the multipurpose vehicle 60 arrives at a location at which the passenger is expected to unboard, a signal indicating that the vehicle is arriving may be transmitted through the passenger terminal 80 or an internal alarm of the multipurpose vehicle 60. Thereafter, the multipurpose vehicle 60 is stopped, and then the vehicle controller 10 opens the boarding door 50 of the boarding space 30 to allow the passenger to unboard. When the passenger unboards, the vehicle controller 10 opens the loading space door 40 of the loading space 20 for the passenger to unload the small mobility device. Since unloading of the small mobility device from the loading space 20 denotes that the passenger is unboarded, the vehicle controller 10 closes both the loading space 20 and the boarding space 30 and then allows the vehicle to start. Through these operations, the passenger can freely move inside the multipurpose vehicle 60, and can smoothly load or unload the small mobility device of the passenger.

The loading space door 40 for opening or closing the loading space 20 may be provided in the multipurpose vehicle 60, and the boarding door 50 for opening or closing the boarding space 30 may be provided therein.

If the passenger carries a small mobility device in the multipurpose vehicle 60, since the passenger needs to load the small mobility device into the loading space 20 when boarding and needs to unload the small mobility device from the loading space 20 when unboarding, the multipurpose vehicle 60 should be provided with the loading space door 40. Furthermore, there is a demand for the boarding space 30 for a passenger to board to and unboard from when arriving at a destination, and there needs to be provided the boarding door 50 to open or close the boarding space 30. Control of opening or closing of the loading space 20 and the boarding space 30 by the vehicle controller 10 denotes opening or closing of the loading space door 40 and the boarding door 50, respectively.

The control unit may include: the vehicle controller 10 provided in the vehicle and configured to control opening or closing of the loading space 20, opening or closing of the boarding space 30, and driving of the vehicle; and the server 70 provided outside the vehicle and configured to receive a request from the passenger terminal 80 and transmit the request to the vehicle controller 10.

The control unit includes: the vehicle controller 10 configured to control the vehicle; and the server 70 provided outside the vehicle and configured to interwork with the vehicle controller 10 to perform control such that opening or closing of the loading space 20, opening or closing of the boarding space 30, and driving of the vehicle interwork with each other. The server 70 is configured to interwork with the vehicle controller 10 to control opening or closing of the loading space 20, opening or closing of the boarding space 30, and driving of the vehicle such that, when there is a passenger who possesses or utilizes a small mobility device among passengers, opening or closing of the loading space 20, opening or closing of the boarding space 30, and driving of the vehicle interwork with each other.

The server 70 may receive a request for boarding or unboarding from the passenger terminal 80, and if information regarding use of the small-mobility device loading space 20 is included therein, the server 70 may transmit the request and information together to the vehicle controller 10.

The server 70 receives a request from the passenger's cell phone or other mobile terminal 80, and the request may include an area in which a passenger carrying a small mobility device is to board or an area in which the passenger is expected to unboard, and information relating to whether the passenger carries the small mobility device. Furthermore, the request may include information regarding a space remaining in the loading space 20 and the boarding space 30. Therefore, the server 70 receives the request for boarding or unboarding from the passenger terminal 80 and then, if information regarding use of the small-mobility device loading space 20 is included therein, the server 70 transmits the request and the information together to the vehicle controller 10 to enable the transmitted request for boarding or unboarding and information regarding the use of the small-mobility device loading space 20 to be used.

FIG. 2 illustrates opening or closing of the loading space 20 and opening or closing of the boarding space 30 in the multipurpose vehicle 60.

Referring to FIG. 2, the vehicle controller 10 may control opening or closing of the loading space 20, opening or closing of the boarding space 30, and driving of the vehicle by checking whether a small mobility device is loaded and whether a passenger is on board.

As shown in FIG. 2, the passenger may load the small mobility device into the loading space 20 in a direction in which the small mobility device is easily loaded and unloaded, and may efficiently use the space. As a method for loading the small mobility device, the small mobility device may be loaded into the loading space 20 of the multipurpose vehicle 60 without being folded or may be loaded in a folded state. Since the vehicle controller 10 may control opening or closing of the loading space 20, opening or closing of the boarding space 30, and driving of the vehicle in a manner of checking whether a small mobility device is loaded and whether a passenger is on board, the driving operation may be performed smoothly without spending time to stop the car.

The server 70 may receive a request for boarding or unboarding through a kiosk provided inside or outside of the multipurpose vehicle 60.

The server 70 may be provided inside or outside of the multipurpose vehicle 60, and may be configured to receive a request for boarding or unboarding from the passenger terminal 80, and if information regarding use of the small-mobility device loading space 20 is included therein, the server 70 may be configured to transmit the request and information together to the vehicle controller 10. The server 70 provided inside or outside of the multipurpose vehicle 60 may receive, through a kiosk, a request for boarding or unboarding of a passenger who possesses or utilizes a small mobility device, the kiosk being recently widely used as an unmanned information terminal 80 that utilizes a non-face-to-face touch screen method.

The vehicle controller 10 may control driving of a vehicle after closing both the loading space 20 and the boarding space 30 when the small mobility device is loaded and the passenger is boarded.

The vehicle controller 10 may need to control the vehicle to start again by detecting that the small mobility device is loaded and the passenger is boarded. Here, if the loading space 20 or the boarding space 30 is open, there is a risk that other passengers riding in the boarding space 30 may be injured, or the small mobility device loaded into the loading space 20 may be damaged due to impact. Therefore, when the small mobility device is loaded and the passenger is boarded, the vehicle controller 10 needs to close both the loading space 20 and the boarding space 30 and then control driving of the vehicle.

FIG. 3 is a flowchart illustrating a transportation method using the multipurpose vehicle 60.

Referring to FIG. 3, provided is a transportation method using a multipurpose vehicle 60, the transportation method including: an operation in which the server 70 receives a request (indicated by reference numeral S20), which is input to a passenger terminal 80 of a passenger who possesses or utilizes a small mobility device (indicated by reference numeral S10), and transmits the request to the vehicle controller 10 (indicated by reference numeral S30); an operation in which the vehicle controller 10 opens or closes the loading space 20 of the multipurpose vehicle 60 and the boarding space 30 to which a passenger is to board, according to the request received by the server 70, at the time of departure of the multipurpose vehicle 60 (indicated by reference numerals S40 and S50); and an operation of opening or closing the boarding space 30 and the loading space 20 of the multipurpose vehicle 60 to allow the passenger who possesses the small mobility device to unboard, when the multipurpose vehicle 60 arrives according to the request input to the passenger terminal 80 (indicated by reference numerals S80 and S90).

The operation in which the vehicle controller 10 opens or closes the loading space 20 and the boarding space 30 when the multipurpose vehicle 60 departs (indicated by reference numerals S40 and S50) includes opening or closing the loading space 20 to allow the small mobility device to be loaded and then opening or closing the boarding space 30 where the passenger is to board, by the vehicle controller 10.

The operation in which the vehicle controller 10 opens or closes the boarding space 30 and the loading space 20 when the multipurpose vehicle 60 arrives (indicated by reference numerals S80 and S90) includes opening or closing the boarding space 30 from which the passenger is to unboard to allow the passenger to unboard, and then opening or closing the loading space 20.

The operation in which the server 70 receives the request input to the passenger terminal 80 of the passenger who possesses or utilizes the small mobility device and transmits the request to the vehicle controller 10 (indicated by reference numeral S30) includes receiving a request for boarding or unboarding from the passenger terminal 80, and if information regarding use of the small-mobility device loading space 20 is included therein, transmitting the request and the information together to the vehicle controller 10.

The operation in which the server 70 receives the request input to the passenger terminal 80 of the passenger who possesses or utilizes the small mobility device and transmits the request to the vehicle controller 10 (indicated by reference numeral S30) includes receiving the request for boarding or unboarding through a kiosk inside or outside of the multipurpose vehicle 60 and transmitting the request to the vehicle controller 10.

The transportation method further includes an operation of receiving, by the server 70, updated opening/closing information of the loading space 20 and the boarding space 30 (indicated by reference numeral S60), after the operation in which the vehicle controller 10 opens or closes the loading space 20 of the multipurpose vehicle 60 and the boarding space 30 to which the passenger is to board according to the request received by the server 70 at the time of departure of the multipurpose vehicle 60 (indicated by reference numerals S40 and S50).

The transportation method further includes an operation of receiving, by the server 70, updated opening/closing information of the loading space 20 and the boarding space 30 (indicated by reference numeral S60), after the operation of opening or closing the loading space 20 and the boarding space 30 of the multipurpose vehicle 60 to allow the passenger who possesses the small mobility device to unboard when the multipurpose vehicle 60 arrives (indicated by reference numerals S80 and S90).

The transportation method further includes an operation in which the vehicle controller 10 controls driving of the vehicle after closing both the loading space 20 and the boarding space 30 when the small mobility device is unloaded and the passenger is unboarded (indicated by reference numeral S100), after the operation of opening or closing the loading space 20 and the boarding space 30 of the multipurpose vehicle 60 to allow the passenger who possesses the small mobility device to unboard when the multipurpose vehicle 60 arrives.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A transportation system using a vehicle, the transportation system comprising:
   the vehicle including a loading space for a mobility device and a boarding space for a passenger; and
   a control unit configured to control opening or closing of the loading space, opening or closing of the boarding space, and driving of the vehicle so that, when there is a passenger who possesses or utilizes the mobility device among passengers, opening or closing of the loading space, opening or closing of the boarding space, and driving of the vehicle interwork with each other, wherein the control unit includes:
- a vehicle controller provided in the vehicle and configured to control the opening or the closing of the loading space, the opening or the closing of the boarding space, and the driving of the vehicle; and
- a server provided outside the vehicle and configured to receive a request from a passenger terminal and transmit the request to the vehicle controller, wherein when information regarding use of a mobility device loading space is included in the request, the server is configured to transmit the request and the information to the vehicle controller, wherein the sever is further configured to transmit information regarding a space remaining in the loading space and the boarding space to the vehicle controller, and wherein the server is further configured for receiving updated opening/closing information of the loading space and the boarding space from the vehicle controller.

2. The transportation system of claim 1, wherein the vehicle further includes a loading space door for opening or closing the loading space, and a boarding door for opening or closing the boarding space.

3. The transportation system of claim 1, wherein the server is configured to receive the request for boarding or unboarding from the passenger terminal.

4. The transportation system of claim 1, wherein the vehicle controller is configured to check whether the mobility device is loaded on the vehicle and whether the passenger is on board on the vehicle to control the opening or the closing of the loading space, the opening or the closing of the boarding space, and the driving of the vehicle.

5. The transportation system of claim 3, wherein the server is configured to receive the request for boarding or unboarding through a kiosk provided inside or outside of the vehicle.

6. The transportation system of claim 4, wherein, when the mobility device is loaded and the passenger is boarded, the vehicle controller is configured to control the driving of the vehicle after closing the loading space and the boarding space.

7. The transportation system of claim 1, wherein the server is configured for receiving the updated opening/closing information of the loading space and the boarding space, after the vehicle controller opens or closes the loading space and the boarding space of the vehicle to which the passenger is to board when the vehicle departs according to the request received by the server.

8. The transportation system of claim 1, wherein the server is configured for receiving the updated opening/closing information of the loading space and the boarding space, after the opening or the closing of the loading space and the boarding space of the vehicle, to allow the passenger who possesses the mobility device to unboard when the vehicle arrives.

9. The transportation system of claim 1, wherein the vehicle controller is configured for controlling the driving of the vehicle after closing the loading space and the boarding space when the mobility device is unloaded and the passenger is unboarded, after the opening or the closing of the loading space and the boarding space of the vehicle, to allow the passenger who carries the mobility device to unboard when the vehicle arrives.

10. A transportation method using a vehicle, the transportation method comprising:
- receiving, by a server, a request input to a passenger terminal of a passenger who possesses or utilizes a mobility device and transmitting, by the server, the request to a vehicle controller;
- opening or closing, by the vehicle controller, a loading space and a boarding space of the vehicle, in which the passenger is to board, when the vehicle departs, according to the request received by the server; and
- opening or closing, by the vehicle controller, the loading space and the boarding space of the vehicle to allow the passenger who possesses the mobility device to unboard when the vehicle arrives according to the request input to the passenger terminal, wherein the receiving of the request input to the passenger terminal of the passenger who possesses or utilizes the mobility device and the transmitting of the request to the vehicle controller, by the server, includes receiving the request for boarding or unboarding from the passenger terminal, and when information regarding use of a mobility device loading space is included therein, transmitting the request and the information together to the vehicle controller, wherein the sever is further configured to transmit information regarding a space remaining in the loading space and the boarding space to the vehicle controller, and wherein the transportation method further includes receiving, by the server, updated opening/closing information of the loading space and the boarding space from the vehicle controller.

11. The transportation method of claim 10, wherein the opening or the closing of the loading space and the boarding space when the vehicle departs, by the vehicle controller, includes opening or closing the loading space to allow the mobility device to be loaded to the vehicle and then opening or closing the boarding space to which the passenger is to board, by the vehicle controller.

12. The transportation method of claim 10, wherein the opening or the closing of the loading space and the boarding space when the vehicle arrives, by the vehicle controller, includes opening or closing the boarding space from which the passenger is to unboard to allow the passenger to unboard, and then opening or closing the loading space.

13. The transportation method of claim 10, wherein the receiving of the request input to the passenger terminal of the passenger who possesses or utilizes the mobility device and the transmitting of the request to the vehicle controller, by the server, includes receiving the request for boarding or unboarding through a kiosk provided inside or outside of the vehicle and transmitting the request to the vehicle controller.

14. The transportation method of claim 10, wherein the receiving, by the server, the updated opening/closing information of the loading space and the boarding space is performed after the opening or closing, by the vehicle controller, the loading space and the boarding space of the vehicle to which the passenger is to board when the vehicle departs according to the request received by the server.

15. The transportation method of claim 10, wherein the receiving, by the server, the updated opening/closing information of the loading space and the boarding space is performed after the opening or closing of the loading space and the boarding space of the vehicle to allow the passenger who possesses the mobility device to unboard when the vehicle arrives.

16. The transportation method of claim 10, further including controlling, by the vehicle controller, driving of the vehicle after closing the loading space and the boarding space when the mobility device is unloaded and the passenger is unboarded, after the opening or closing of the loading space and the boarding space of the vehicle to allow the passenger who carries the mobility device to unboard when the vehicle arrives.

\* \* \* \* \*